United States Patent [19]
McManus

[11] Patent Number: 5,858,067
[45] Date of Patent: Jan. 12, 1999

[54] EX SITU DEGASSING AND SORBATE LOADING SYSTEM FOR MANUFACTURE OF SORBENT-BASED FLUID STORAGE AND DISPENSING APPARATUS

[75] Inventor: James V. McManus, Danbury, Conn.

[73] Assignee: Advanced Technology Materials, Inc., Danbury, Conn.

[21] Appl. No.: 859,652

[22] Filed: May 20, 1997

Related U.S. Application Data

[60] Provisional application No. 60/017,925 May 20,1996.
[51] Int. Cl. [6] .................................................. B01D 53/12
[52] U.S. Cl. ................................. 95/109; 95/110; 96/123; 96/150; 55/356
[58] Field of Search ........................... 55/356, 357, 385.3; 95/107–111; 96/123, 150

[56] References Cited

U.S. PATENT DOCUMENTS

| | | | |
|---|---|---|---|
| 3,080,307 | 3/1963 | Rinald | 96/127 X |
| 3,093,564 | 6/1963 | Weisman et al. | 96/127 X |
| 4,744,221 | 5/1988 | Knollmueller | 62/48 |
| 5,464,597 | 11/1995 | Tang | 95/108 X |
| 5,518,528 | 5/1996 | Tom et al. | 95/103 |
| 5,540,757 | 7/1996 | Jordan, Sr. | 95/107 X |
| 5,567,228 | 10/1996 | Abdulally | 95/109 |
| 5,704,965 | 1/1998 | Tom et al. | 95/95 |

*Primary Examiner*—Robert Spitzer
*Attorney, Agent, or Firm*—Oliver A. M. Zitzmann; Steven J. Hultquist

[57] ABSTRACT

An apparatus for manufacturing a sorbent-containing fluid storage and dispensing vessel. A fluidizing vessel is arranged to hold a fluidized bed of solid-phase physical sorbent material, and sorbent material is fed to the fluidizing vessel. The sorbent material is fluidized with sorbable gas, to load the sorbent material with the gas and yield sorbate gas-loaded sorbent material. The sorbate gas-loaded sorbent material is transported from the fluidized bed into a storage and dispensing vessel, for subsequent use of the storage and dispensing vessel to selectively dispense the gas. Heat of adsorption effects are substantially eliminated in the fluidized bed, permitting the storage and dispensing vessel to be loaded at substantially ambient temperature.

20 Claims, 3 Drawing Sheets

EX SITU DEGASSING AND SORBATE LOADING SYSTEM FOR MANUFACTURE OF SORBENT-BASED FLUID STORAGE AND DISPENSING APPARATUS

CROSS-REFERENCE TO RELATED APPLICATION

This application is based on and claims the priority of United States Provisional Patent Application No. 60/017,925 filed May 20, 1996.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the present invention relates to a system for manufacturing storage and dispensing apparatus of such type, in which the sorbent is fully prepared and loaded with sorbate prior to its introduction to the storage and dispensing vessel.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release. The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

In the manufacture of storage and dispensing systems of the foregoing type, the preparation of the vessel involves degassing same, by high temperature bake-out. Correspondingly, the sorbent medium itself is desirably subjected to elevated temperature conditions prior to contacting the sorbent with the sorbable fluid, so that water, atmospheric gases, other previously sorbed gases, etc., are removed from the sorbent pores and surface area, to maximize the subsequent loading of the sorbable fluid on the sorbent medium.

Accordingly, it has been common practice in the art to load the sorbent material in the cylinder or other vessel to be employed in the storage and dispensing system, and to carry out a high temperature bake-out of the vessel, so that both the vessel and the sorbent therein are simultaneously degassed, in preparation for the subsequent introduction of sorbable fluid into the vessel for contacting with and sorption on the sorbent material.

While economical in terms of carrying out both heating steps at once, the heating of the cylinder and the sorbent therein requires significant cool-down time for the system to reach a temperature at which the contacting of the sorbent with the sorbable fluid can take place. This is due to the fact that the equilibrium capacity (loading) of the sorbent for the sorbate is a decreasing function of temperature, so that the higher temperatures of the bake-out step are highly unfavorable to high loading of sorbate on the sorbent.

In this respect, the vessel employed in the storage and dispensing system is typically a metal walled cylinder, and the thermal mass of the cylinder is therefore considerable. Although the cylinder by itself could easily be chilled to ambient at relatively high rates of cooling, the fact that the sorbent bed in the cylinder contains significant interstitial void space between the packed particles of sorbent in the bed means that the heat transfer from the hot sorbent to the ambient surroundings will be slow.

A further difficulty in the manufacture of storage and dispensing systems of the foregoing type is that the loading of the sorbable fluid on the sorbent is exothermic in character, and therefore the bed will increase in temperature. For a sorbable fluid such as arsine, the temperature rise in contacting a bed of sorbent with the gas may be on the order of 100 degrees Centigrade or even more. Under these circumstances, the fill operation for the sorbent exposure to the sorbable fluid must be carried out slowly or in stages, and/or substantial time is required to cool out the sorbent to ambient temperature. The retardation of the sorbate loading process to accommodate such heat of sorption effects, or alternatively the slow cool-down to ambient temperature occurring when the sorbate is loaded all at once, are substantial impediments to the high speed, large volume manufacturing of the storage and dispensing system units.

It would therefore be a significant advance in the art, and accordingly is an object of the invention, to provide a means and method for manufacturing storage and dispensing systems of the foregoing type, which avoids the need for long-term cool-down of the vessel and sorbent subsequent to degassing thereof, and which substantially eliminates the adverse heat of sorption effects which have hindered prior art efforts to achieve high volume manufacturing of the storage and dispensing systems described hereinabove.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel constructed and arranged to hold a solid-phase physical sorbent medium having a sorptive affinity for the sorbable fluid. and for selectively flowing sorbable fluid into and out of such vessel. A solid-phase physical sorbent medium having a sorptive affinity for the fluid is disposed in the storage and dispensing vessel at an interior gas pressure. The sorbable fluid is physically adsorbed on the sorbent medium. A dispensing assembly is coupled in gas flow communication with the storage and dispensing vessel, and constructed and arranged for selective on-demand dispensing of desorbed fluid, after thermal and/or pressure differential-mediated desorption of the fluid from the sorbent material.

The sorbent medium in the storage and dispensing system may include any suitable sorbent material. Preferred substrates include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention.

Examples of such crystalline aluminosilicate compositions include 5A molecular sieve, and preferably a binderless molecular sieve.

Potentially useful carbon sorbent materials include so-called bead activated carbon of highly uniform spherical particle shape, e.g., BAC-MP, BAC-LP, and BAC-G-70R, available from Kreha Corporation of America, New York, N.Y.

Although carbon sorbents and molecular sieve materials such as crystalline aluminosilicates are preferred in many instances, the solid-phase physical sorbent medium may usefully comprise other materials such as silica, alumina, macroreticulate polymers, kieselguhr, etc.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

In one aspect, the present invention relates to a system for manufacturing sorbent-based storage and dispensing systems of the above-described type.

The manufacturing apparatus of the present invention in a particular aspect relates to an apparatus for manufacturing a sorbent-containing fluid storage and dispensing vessel, comprising:

a fluidizing vessel constructed and arranged for holding a fluidized bed of a solid-phase physical sorbent material;

means for feeding a solid-phase physical sorbent material to said fluidizing vessel for fluidization therein;

means for fluidizing the solid-phase physical sorbent material with sorbable gas, whereby the solid-phase physical sorbent material is loaded with said gas, to yield sorbate gas-loaded sorbent material;

a storage and dispensing vessel; and means for transporting sorbate gas-loaded sorbent material from the fluidizing vessel into the storage and dispensing vessel, to yield said sorbent-containing fluid storage and dispensing vessel.

Means may be further provided for degassing the solid-phase physical sorbent material prior to contacting the material with said sorbate gas. Such means may for example comprise a fluidized bed fluidized with degassing fluid, to contact the solids-phase physical sorbent material with the degassing fluid, to yield a degassed physical sorbent material.

The fluidized bed fluidized with degassing fluid may be the same as the fluidized bed fluidized with sorbable gas, and the fluidized bed may be constructed and arranged for flowing the degassing fluid therethrough prior to flow of said sorbable gas therethrough.

Alternatively, the fluidized bed fluidized with degassing fluid may be different from the fluidized bed fluidized with sorbable gas, with the fluidized bed fluidized with degassing fluid being arranged in solids flow relationship to the fluidized bed fluidized with sorbable gas, to feed degassed physical sorbent material to the fluidized bed fluidized with sorbable gas.

In a preferred aspect, the storage and dispensing vessel is arranged in a chamber and sorbate gas-loaded sorbent material from the fluidizing vessel is transported into the storage and dispensing vessel, to yield the sorbent-containing fluid storage and dispensing vessel. The chamber preferably is arranged to be maintained at substantially ambient temperature, and may be suitably purged with a gas which is non-deleterious to the sorbent material.

The fluidized bed fluidized with sorbable gas may suitably include a fluidized chemisorbent material having a sorptive affinity for contaminants of the sorbable gas therein, whereby the sorbate gas loading operation is rendered more efficient in that the contaminants are removed concurrently from the sorbate gas as it is being contacted with the sorbent material in the fluidized bed.

Alternative to the use of a single sorbent bed, a multiple fluidized bed system can be employed, in which a first fluidized bed is employed to degas the sorbent by treatment of the sorbent in the fluidized bed with a hot degassing fluidizing medium, and with solids take-off from the first bed. The take-off solids are passed to a second fluidized bed, in which the sorbent solids, depleted in extraneous sorbed and/or otherwise present components, are contacted with the sorbable fluid (as the fluidizing fluid), with take-off of sorbate-loaded sorbent particles and transfer thereof into the storage and dispensing vessels.

In the loading station (glove box or laminar hood), or between the sorbent solids-supplying fluidized bed and the loading station, the sorbent solids may be further cooled by direct or indirect heat exchange.

Thus, in a general aspect, the present invention relates to a method of manufacturing a storage and dispensing vessel, in which the sorbent material is cleaned and loaded with sorbate gas ex situ, i.e., outside of the vessel, with the vessel then being filled with the ex situ degassed sorbent material.

Other aspects and features of the invention will be more fully apparent from the ensuing disclosure and appended claims.

BRIEF DESCRIPTION OF THE DRAWINGS

These and other features, aspects, and advantages of the present invention will become better understood when the following detailed description is read with reference to the accompanying drawings wherein.

DETAILED DESCRIPTION OF THE INVENTION, AND PREFERRED EMBODIMENTS THEREOF

The disclosure of U.S. Pat. No. 5,518,528 issued May 21, 1996 in the names of Glenn M. Tom and James V. McManus, and the disclosure of U.S. patent application Ser. No. 08/650,634 filed May 20, 1996, now U.S. Pat. No. 5,704,965, in the names of Glenn M. Tom and James V. McManus for "FLUID STORAGE AND DELIVERY SYSTEM UTILIZING CARBON SORBENT MEDIUM", hereby are incorporated herein by reference in their entirety.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
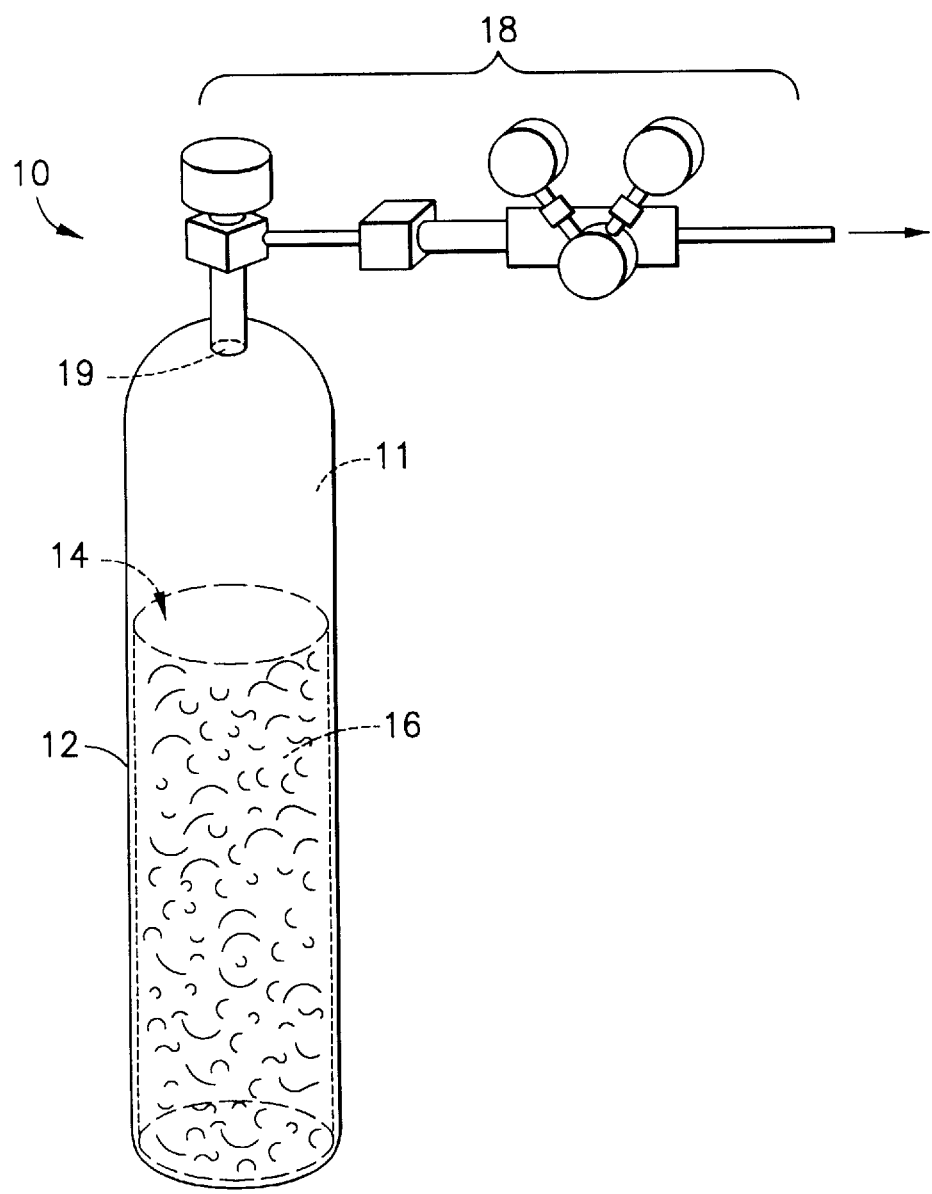
FIG. 1 is a schematic perspective representation of a storage and dispensing vessel and associated flow circuitry according to one embodiment of the invention, which may be usefully employed for the storage and dispensing of fluid.

Referring now to the drawings, FIG. 1 is a schematic representation of a storage and dispensing system 10 comprising storage and dispensing vessel 12. The storage and dispensing vessel may for example comprise a conventional gas cylinder container of elongate character. In the interior volume of such vessel is disposed a bed 14 of a suitable sorbent medium 16.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The vessel 12 may be provided with internal heating means (not shown) which serve to thermally assist desorption of the sorbate fluid. Preferably, however, the sorbate fluid is at least partially, and most preferably fully, dispensed from the storage and dispensing vessel containing the adsorbed fluid by pressure differential-mediated desorption. Such pressure differential may be established by flow communication between the storage and dispensing vessel, on the one hand, and the exterior dispensing environment or locus of use, on the other. Alternatively, the pressure desorption condition may be imposed by pumping on the vessel containing the sorbent material holding the sorbate fluid, or otherwise exerting suction thereon.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition. e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The sorbent may be provided in the form of particles, granules, extrudates, powders, cloth, web materials, honeycomb or other monolithic forms, composites, or other suitable conformations of useful sorbent materials, having sorptive affinity for the fluid sought to be stored and subsequently dispensed, and satisfactory desorption characteristics for the dispensing operation.

As mentioned, although it generally is preferred to operate solely by pressure differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate fluid therein.

Figure 2:
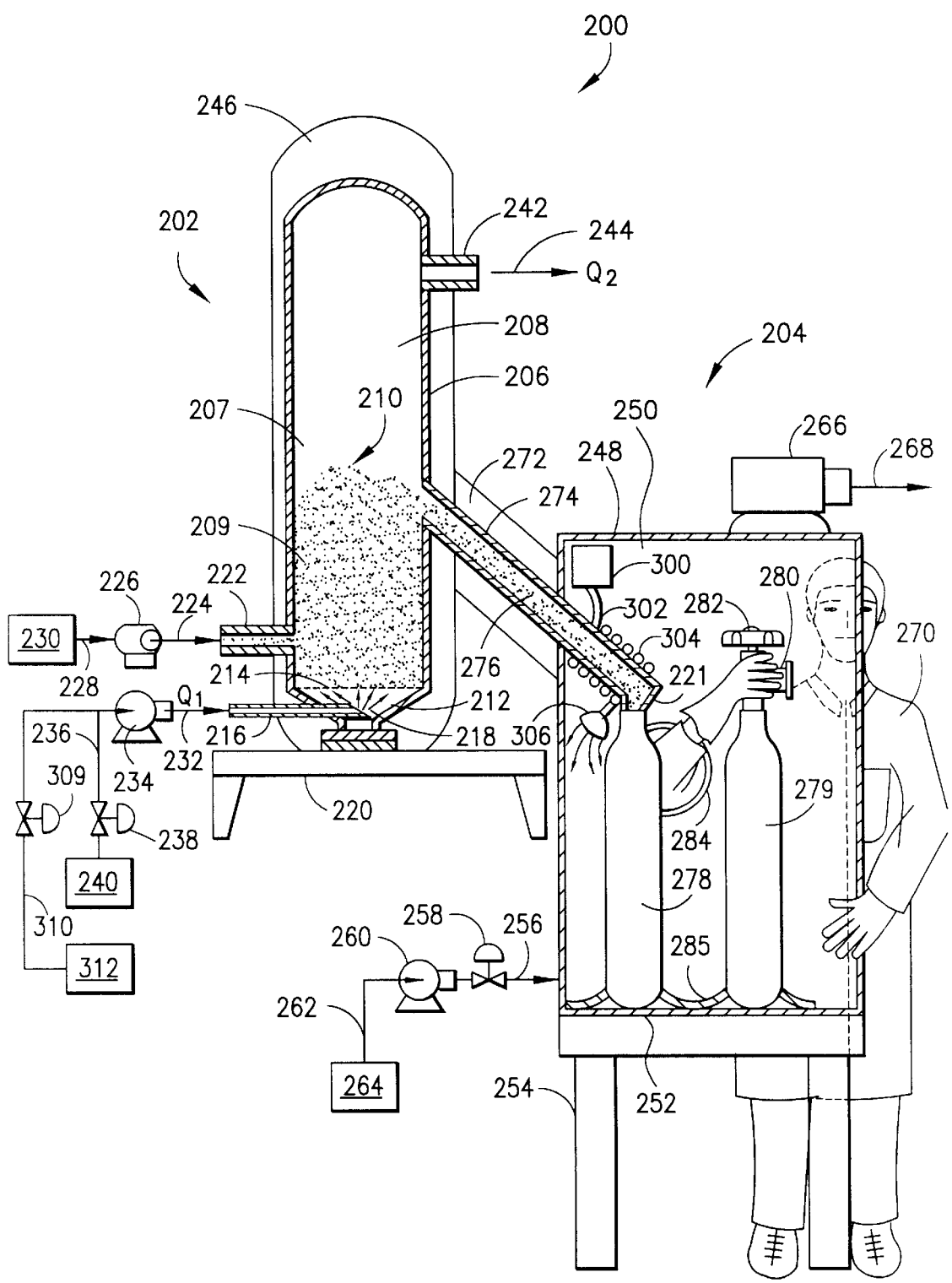
FIG. 2 is a schematic view in partial cross-section, showing a manufacturing system for the sorbent-based storage and delivery system, in one embodiment of the invention.

FIG. 2 is a schematic partial cross-sectional view of a manufacturing system 200 according to one illustrative embodiment of the invention.

The manufacturing system 200 comprises a fluidized bed system 202 and a glove box fill and assembly station 204. The fluidized bed system 202 includes a fluidizing vessel 206 defining an enclosed interior volume 207 for fluidizing sorbent particles 209 in the fluidizing bed 210 and for disengaging the fluidizing fluid from the particles in the head space 208 of the vessel.

The fluidizing vessel 206 is provided with a solids feed conduit 222, through which solid sorbent particles are introduced into the fluidized bed 210 from sorbent particles supply reservoir 230, from which the particles are extracted in line 228 by solids pump 226 and passed in line 224 to the solids feed conduit 222.

Fluidizing gas is introduced to the vessel 206 by fluidizing gas inlet conduit 216 terminating in gas sparging nozzle 218 in the lower plenum 212 of the vessel, for flow upwardly in the vessel through the openings in the grate or grid 214, which has openings preventing the solid particles being fluidized from passage therethrough.

In the embodiment shown, the fluidizing gas derives from one of two alternative and sequentially employed sources. The first source vessel 240 holds degassing medium which flows through open valve 238 and line 236 to the pump 234 in line 232 for discharge in pressurized fluid line 232 to the fluidizing gas inlet conduit 216. The degassing medium may be suitably heated in the source vessel 240 (by means not shown in FIG. 2) or otherwise to provide a fluidizing medium of appropriate temperature to degas the sorbent particles.

The second source vessel 312 holds sorbate medium which flows through open valve 309 and line 310 to the pump 234 in line 232 for discharge in pressurized fluid line 232 to the fluidizing gas inlet conduit 216. The sorbate medium may be suitably cooled in the source vessel 312 (by means not shown in FIG. 2) or otherwise to provide a fluidizing medium of appropriate temperature to combat the heat of adsorption effects resulting from contact of the sorbate fluid with the sorbent particles, although such expedient in general is not necessary, since the fluidization process typically obviates such heat effects, or at least markedly reduces them.

It will be appreciated that during the respective source gas fluidizations (from sources 240 and 312, respectively), the valves 238 and 309 are adjusted so that the valve in the line from the active fluidizing source is open while the other valve of the off-line fluidizing source is closed.

The fluidized bed vessel 206 is as shown reposed on a support structure 220, and the vessel is enclosed in a blanket 246 of thermal insulation material serving to maintain isothermal operation in the fluidizing bed 210.

The solids thus are degassed in the fluidized bed without solids removal, followed by fluidization with the sorbate fluid to load the sorbent particles therewith. The attendant heat of sorption effects are dissipated by bulk hydrodynamic effects of the flow of the fluidizing gas, which is discharged from the fluidized bed vessel 206 in conduit 242 in the direction indicated by arrow 244.

The fluidizing media, viz., the degassing fluid and the sorbate fluid, when discharged from the fluidized bed vessel 206 in conduit 242 may be recovered via recycle or otherwise, or may alternatively be sent to final treatment and disposition.

As shown in FIG. 2, the fluidized bed system is coupled by means of solids take-off conduit 274 to the glove box station 204, in which the conduit 274, carrying the sorbate-loaded sorbent particles 276, terminates at a flared funnel-shaped end portion 221. The funnel shaped end portion 221 discharges into a cylinder 278 on stand 285 on the floor 252 of the glove box.

The glove box comprises an enclosure 248 containing interior volume 250. The glove box is reposed on support legs 254 as illustrated, and the rear wall features porthole opening 284, through which a worker 270 can access the cylinder 279 which has been filled with sorbate-loaded sorbent, and secure a valve head assembly 280, featuring manual wheel valve actuator 282, to the neck of the cylinder. The glove box may feature a curtain structure (not shown) of sufficient dimensional character to permit ingress and egress of cylinders 278 and 279.

The glove box is shown with a supply 264 of inert gas which flows in line 262 to the blower 260 for discharge into line 256 containing valve 258 therein, and introduction to the interior volume 250 of the glove box. The inert blanket gas is discharged from the glove box via exhaust module 266 into line 268 for recycle, recovery, or treatment and discharge thereof from the manufacturing facility.

An insulative sleeve 272 of suitable thermal insulation material surrounds the solids transfer conduit 274 so that isothermal conditions are maintained in flow to the glove box. The glove box in the FIG. 2 embodiment features a cryogenic or other coolant fluid source 300 which is in fluid flow communication via line 302 with cooling jacket 304 for quenching of the solids 276 if and to the extent necessary or desirable. The cooling jacket in the FIG. 2 embodiment discharges the coolant fluid into a fluid distributor 306. By this arrangement, the need for the blanket inert gas (from source vessel 264) may be obviated, and the discharged coolant fluid from the distributor 306 may be exhausted from the glove box chamber by exhaust unit 266 as previously described in respect of the blanket inert gas.

In operation of the FIG. 2 system, the fluidized bed is first fluidized with the degassing fluid, and solid sorbent particles then are introduced to the fluidizing bed vessel 206 for fluidization therein. After the degassing operation has been carried out, the flow of degassing fluid is terminated and the sorbable fluid from source vessel 312 is introduced to the fluidizing bed vessel. After the fluidized bed loading of the sorbate on the physical adsorbent particles has taken place, the sorbate-loaded particles are transferred in take-off conduit 274 to the glove box and cylinder 278, with optional cooling via the coolant from vessel 300, if desired. Once the cylinder has been filled, the filled cylinder 279 is fitted with a valve head assembly 280 and leaktightly sealed, for subsequent usage.

In use, the manual actuator wheel 282 is selectively rotated to open the valve of the cylinder, to dispense the sorbate via pressure differential or thermally assisted desorption.

In lieu of the single fluidized bed system employed in FIG. 2, there may be employed two discrete fluidized beds, in which a first fluidized bed is employed to degas the sorbent by treatment of the sorbent in the fluidized bed with a hot degassing fluidizing medium, and with solids take-off from the first bed. The take-off solids are passed to a second fluidized bed, in which the sorbent solids, as degassed and prepared for subsequent sorbate loading, are contacted with the sorbable fluid (as the fluidizing fluid), with take-off of sorbate-loaded sorbent particles and transfer thereof into the glove box for filling of the storage and dispensing vessels.

As a still further alternative, any other number of fluidized beds may be employed to carry out the degassing or other pre-treatment of the sorbent solids (e.g., treatment of the degassed solids with other reagents) to enhance the sorptive capacity of the sorbent solids. Additionally, any number of beds may be employed to carry out the step of contacting the sorbent material with the sorbate fluid.

Figure 3:
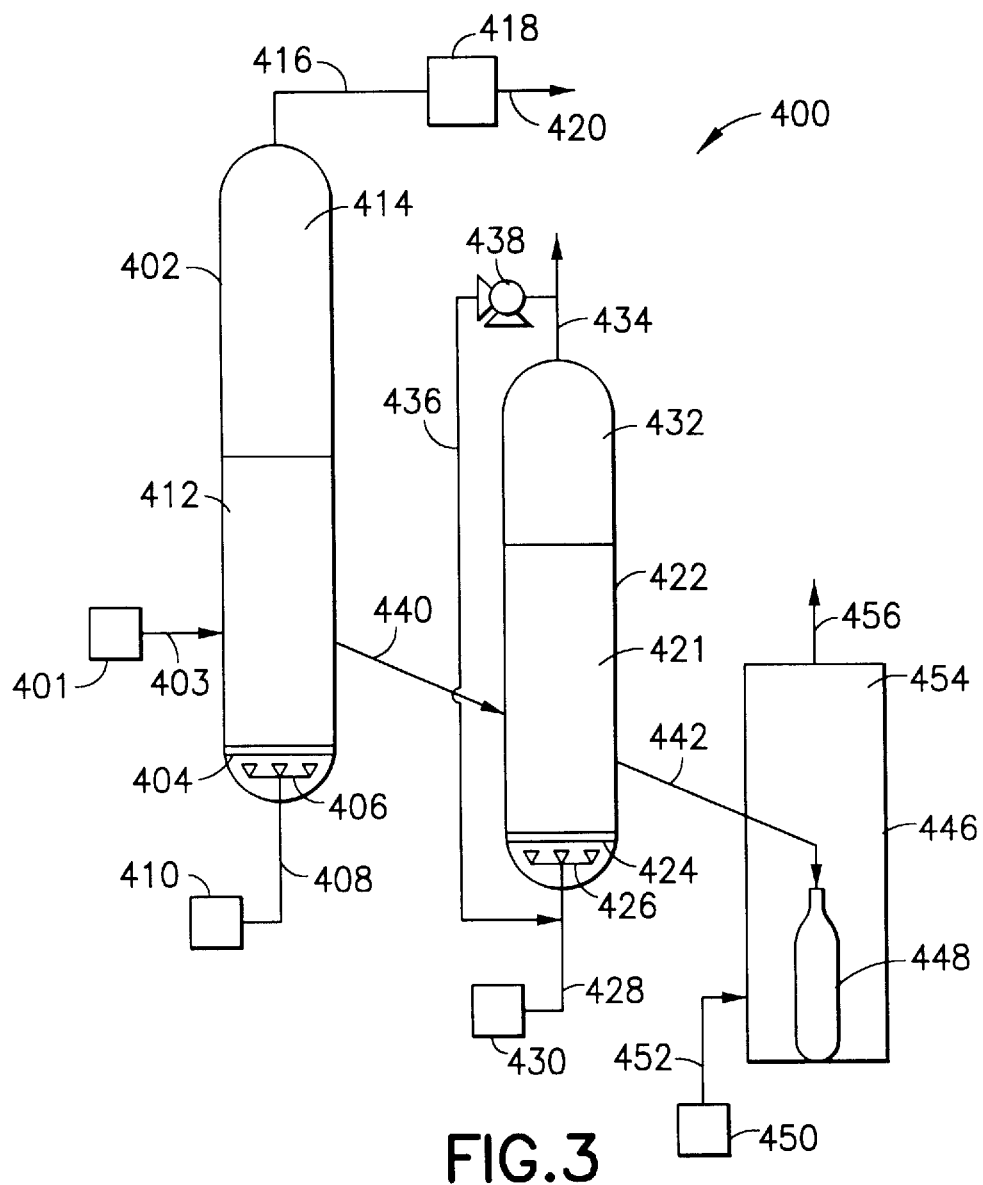
FIG. 3 is a schematic flowsheet of an embodiment of the present invention, comprising a degassing fluidized bed, a sorbate-loading fluidized bed, and a chamber for filling gas cylinders.

FIG. 3 is a schematic representation of a multiple fluidized bed system 400 according to another embodiment of the present invention. Sorbent material from sorbent material source 401 is passed in line 403 to the first fluidized vessel 402 to form the solids phase in the fluidized bed 412 therein. The fluidized vessel 402 is of elongate vertically upstanding character, and is provided at a lower portion thereof with a bed support element 404, which may for example comprise a grid, screen or other foraminous member. The fluidizing gas from source 410 is flowed through feed line 408 to distributor 406 for discharge and flow through the bed support element upwardly in the vessel.

In the upper portion of the vessel 402, the fluidizing gas disengages from the fluidized solids and enters the headspace 414 of the vessel, for discharge in line 416 from the vessel. Such discharged gas may be flowed through the treatment complex 418 for removal from the gas of any deleterious components, prior to final discharge from the system in line 420.

The fluidizing gas may be of any suitable type, which in contact with the sorbent particles in the fluidized bed causes the undesirable contaminants to desorb from the solids particles and pass into the fluidizing gas stream. For this purpose, the gas introduced to the vessel in line 408 may be heated to improve the efficacy of the contaminant desorption process.

The purpose of the first fluidizing vessel in the system shown in FIG. 3 is to "clean" the sorbent material of any contaminants that may be deleterious to the sorbent material in its ultimate use.

The resulting decontaminated sorbent material then passes by gravity feed line 440 from the fluidized bed 412 in the first vessel 402 into the fluidized bed 421 in second fluidized vessel 422. The second fluidized vessel 422 receives fluidizing gas from source 430, which is the sorbate gas desired to be loaded on the sorbent material. The sorbate gas flows from source 430 in line 428 to distributor 426, and then flows upwardly through the foraminous bed support element 424 to fluidize the bed 421.

At an upper part of the vessel 422, the fluidizing gas disengages from the solids being fluidized, and enters the headspace 432, from which the gas is discharged from the vessel at the top end thereof, in line 434. At least a part of the fluidizing gas may be flowed under the impetus of pump 438 into recycle line 436, for recirculation to the fluidizing gas feed line 428. The unrecycled fluidizing gas may be passed to other treatment or end use disposition step(s).

By this arrangement, the fluidizing gas is loaded on the sorbent material particles in the fluidized bed, and thereby prepared for packaging. The sorbate-loaded sorbent medium then is passed by gravity feed pipe 442, or other suitable solids flow feed means, to the gas storage and dispensing cylinder 448 mounted in the cabinet 446, which is purged with non-sorbable (by the sorbent material) gas. The purge gas is flowed to the interior volume 454 of the cabinet from source 450 in line 452 to the cabinet. The cabinet vents the purge gas in line 456, and it may thereafter be further processed or discharged, as necessary or appropriate.

The storage and dispensing cylinder in cabinet 446 is filled to an appropriate level, either manually or by automatic fill means (not shown), and sealed with installation of a cylinder head assembly (not shown; see FIG. 2). The finished cylinder thereafter is removed from the cabinet, and may be transported to the final use location or application.

The FIG. 3 system may be employed to fill the cylinders in a ready and convenient manner. In general, multiple beds can be employed as shown and described with reference to FIG. 3 hereof. Alternatively, a single fluidized bed may be employed and run sequentially in a first "cleaning" mode, to remove contaminants from the sorbent material, and then in a sorbate gas loading mode, to contact the sorbate gas with the solid particulate sorbent material, to yield the sorbate-loaded sorbent for transport to the cylinder for finalization of the cylinder manufacturing process.

The features and advantages of the invention are more fully shown by the following non-limiting example:

EXAMPLE

Set out below is an example of the process conditions applicable to manufacturing of a sorbent-containing storage and dispensing vessel, utilizing a fluidized bed for sorbent particulate cleaning (degassing) and sorbate gas loading.

The process variables are as follows:

$Q_1$=flowrate of fluidization medium (ft$^3$/min)

$Q_2$=outlet flowrate of fluidization medium (ft$^3$/min)

$V_{SM}$=minimum superficial velocity of medium through the bed (ft/min)

L=height of the bed

D=diameter of the bed

E=void fraction of sorbent in bed

Degassing: Assume $N_2$ @200° C.

Minimum Fluidization Velocity: velocity at which the pressure drop across the bed counter-balances the force of gravity of the particles; a further increase in velocity causes the particles to separate.

Equation: (7.51) Unit Operations in Chemical Engineering by McGabe, Smith, Harriot. 5th Edition, 1993

$$\frac{150\mu V_{sm}(1-\epsilon)}{I_s^2 D_p^2 \epsilon^3} + \frac{175\rho V_{sm}^2}{I_s D_p \epsilon^3} = g(\rho_P - \rho)$$

wherein the following numerical values are used:

viscosity $\mu$ (for $N_2$@200° C.)≈1.75×10$^{-5}$ lb/ft$^3$ density p (for $N_2$@200° C.)≈0.045 lb/ft$^3$ density of sorbent $P_p$=35.6 lb/ft$^3$ gravity g=32.2 ft/s$^2$ void fraction $\epsilon$≈0.4 for spherical particles particle diameter $D_P$≈1 mm sphericity $I_s$≈1 for spherical particles Substituting the above values into the above equation yields the following quadratic equation:

$$-1146.3+2286V_{sm}+375V_{sm}^2=0$$

Solving for $V_{sm}$ yields $V_{SM}$=0.466 ft/s.

Assume bed diameter D=1 ft., therefore the Area A=$\pi D^2$/4=0.78 ft$^2$ $$Q_1 = V_{sm} \epsilon A = (0.466)(0.4)(0.78)$$

Solution of the above equation therefore yields $$Q_1 = 0.146 \text{ft}^3/\text{s} \approx 8.8 \text{ ft}^3/\text{min}.$$

as the fluidizing gas volumetric flow rate required for the fluidized bed.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. An apparatus for manufacturing a sorbent-containing fluid storage and dispensing vessel, comprising:
   a fluidizing vessel constructed and arranged for holding a fluidized bed of a solid-phase physical sorbent material;
   means for feeding a solid-phase physical sorbent material to said fluidizing vessel for fluidization therein;
   means for fluidizing the solid-phase physical sorbent material with sorbable gas, whereby the solid-phase physical sorbent material is loaded with said gas, to yield sorbate gas-loaded sorbent material;
   a storage and dispensing vessel; and
   means for transporting sorbate gas-loaded sorbent material from the fluidizing vessel into the storage and dispensing vessel, to yield said sorbent-containing fluid storage and dispensing vessel.

2. An apparatus according to claim 1, further comprising means for degassing the solid-phase physical sorbent material prior to contacting the material with said sorbate gas.

3. An apparatus according to claim 2, wherein said means for degassing the solids-phase physical sorbent material comprise a fluidized bed fluidized with degassing fluid, to contact the solids-phase physical sorbent material with the degassing fluid, to yield a degassed physical sorbent material.

4. An apparatus according to claim 3, wherein the fluidized bed fluidized with degassing fluid is the same as the fluidized bed fluidized with sorbable gas, and said fluidized bed is constructed and arranged for flowing the degassing fluid therethrough prior to flow of said sorbable gas therethrough.

5. An apparatus according to claim 3, wherein the fluidized bed fluidized with degassing fluid is different from the fluidized bed fluidized with sorbable gas.

6. An apparatus according to claim 5, wherein the fluidized bed fluidized with degassing fluid is arranged in solids flow relationship to the fluidized bed fluidized with sorbable gas, to feed degassed physical sorbent material to the fluidized bed fluidized with sorbable gas.

7. An apparatus according to claim 1, wherein the storage and dispensing vessel is arranged in a chamber and sorbate gas-loaded sorbent material from the fluidizing vessel is transported into the storage and dispensing vessel, to yield said sorbent-containing fluid storage and dispensing vessel.

8. An apparatus according to claim 7, wherein the chamber is arranged to be maintained at substantially ambient temperature.

9. An apparatus according to claim 7, wherein the chamber is purged with a gas which is non-deleterious to the sorbent material.

10. An apparatus according to claim 7, wherein the sorbate gas-loaded sorbent material from the fluidizing vessel is transported into the storage and dispensing vessel by a transfer conduit which is insulated to maintain an isothermal condition of the sorbate gas-loaded sorbent material therein.

11. An apparatus according to claim 7, wherein the sorbate gas-loaded sorbent material from the fluidizing vessel is transported into the storage and dispensing vessel by a transfer conduit, further comprising a cooling jacket surrounding a portion of the transfer conduit, for quenching of the heat of sorption of the sorbate gas-loaded sorbent material flowing therethrough.

12. An apparatus according to claim 7, wherein the chamber comprises a glove box.

13. An apparatus according to claim 7, wherein the chamber comprises a laminar flow hood.

14. An apparatus according to claim 1, wherein the solid-phase physical sorbent material comprises a material selected from the group consisting of crystalline aluminosilicates, carbon, activated carbon, macroreticulate polymers, silica, alumina, kieselguhr, and combinations thereof.

15. An apparatus according to claim 1, wherein the fluidized bed fluidized with sorbable gas includes a fluidized chemisorbent material having a sorptive affinity for contaminants of the sorbable gas therein.

16. A method for manufacturing a sorbent-containing fluid storage and dispensing vessel, comprising:
   providing a fluidizing vessel constructed and arranged for holding a fluidized bed of a solid-phase physical sorbent material;
   feeding a solid-phase physical sorbent material to said fluidizing vessel for fluidization therein;
   fluidizing the solid-phase physical sorbent material with sorbable gas, whereby the solid-phase physical sorbent material is loaded with said gas, to yield sorbate gas-loaded sorbent material;
   providing a storage and dispensing vessel; and
   transporting sorbate gas-loaded sorbent material from the fluidizing vessel into the storage and dispensing vessel, to yield said sorbent-containing fluid storage and dispensing vessel.

17. A method according to claim 16, further comprising degassing the solid-phase physical sorbent material prior to contacting the material with said sorbate gas.

18. An method according to claim 16, further comprising fluidizing a chemisorbent material having a sorptive affinity for contaminants of the sorbable gas therein during fluidization of the solid-phase physical sorbent material with sorbable gas, to yield sorbate gas-loaded sorbent material.

19. A method of manufacturing a fluid storage and dispensing assembly including a storage and dispensing vessel containing a sorbent material sorptively holding a fluid, wherein the sorbent material is loaded with said sorbate fluid in a fluidized bed utilizing the sorbate fluid as the fluidizing medium therein, to yield sorbate fluid-loaded sorbent material, the sorbate fluid-loaded sorbent material is transferred from the fluidized bed to the storage and dispensing vessel, and the storage and dispensing vessel is sealed.

20. A method according to claim 19, wherein a gas flow discharge assembly is installed on the vessel after the sorbate fluid-loaded sorbent material is transferred from the fluidized bed to the storage and dispensing vessel.

* * * * *

UNITED STATES PATENT AND TRADEMARK OFFICE
CERTIFICATE OF CORRECTION

PATENT NO.    : 5,858,067
DATED         : January 12, 1999
INVENTOR(S)   : James V. McManus Page 1 of 1

It is certified that error appears in the above-identified patent and that said Letters Patent is hereby corrected as shown below:

Column 6,
Line 27: change "des-" to -- de --.

Column 8,
Line 61: change "des-" to -- de- --.

Signed and Sealed this

Twenty-first Day of August, 2001

Attest:

*Nicholas P. Godici*

NICHOLAS P. GODICI
*Attesting Officer*  *Acting Director of the United States Patent and Trademark Office*